United States Patent

Nuding

[15] 3,636,452

[45] Jan. 18, 1972

[54] RADIO RELAY SYSTEM

[72] Inventor: Erich Nuding, Backnang, Germany

[73] Assignee: Licentia Patent-Verwaltungs-G.m.b.H., Frankfurt am Main, Germany

[22] Filed: Aug. 27, 1970

[21] Appl. No.: 67,499

[30] Foreign Application Priority Data

Aug. 28, 1969 Germany ....................... P 19 43 735.5

[52] U.S. Cl. .......................................... 325/3, 325/1, 325/5, 325/8, 325/14, 333/1.1, 333/10, 179/15 BD

[51] Int. Cl. ........................................................ H04b 1/60

[58] Field of Search ......................... 325/1, 3, 5, 8, 14; 333/1, 333/1.1, 6, 10, 24; 343/756, 100 R, 100 PE, 100 CS; 179/15 BD

[56] References Cited

UNITED STATES PATENTS

| | | | |
|---|---|---|---|
| 2,866,949 | 12/1958 | Tillotson | 333/1.1 |
| 3,273,064 | 9/1966 | Kunemund | 333/10 |

*Primary Examiner*—Robert L. Griffin
*Assistant Examiner*—Albert J. Mayer
*Attorney*—Spencer & Kaye

[57] ABSTRACT

The antenna of a broadband radio relay system, of the type wherein all of the receivers and all of the transmitters are connected to respective common transmitting or common receiving lines and connected to the antenna via a combining or mixing filter, is utilized by an auxiliary narrow band radio relay system having a plurality of receivers and transmitters. The receiving and transmitting lines of the auxiliary system are combined, by means of appropriate combining filters, into a common transmission-reception line for the auxiliary system and connected to one port of a four-port circulator included in the system-combining filter.

5 Claims, 3 Drawing Figures

Inventor:
Erich Nuding

BY Spencer & Kaye
ATTORNEYS.

RADIO RELAY SYSTEM

BACKGROUND OF THE INVENTION

The present invention relates to a radio relay system, particularly a broadband radio relay system in which the individual transmitters and receivers at each relay station are connected via appropriate filters to a respective common transmitting or common receiving line and are fed to the antenna through a system combining filter. More particularly, this invention relates to an improvement of such a radio relay system whereby an auxiliary narrow band radio relay system may be provided which utilizes the existing antenna of the broadband system.

Broadband radio relay systems of the above-mentioned type are well known and have been in operation for a long time. Such systems usually operate within the frequency range of 5.9 to 6.4 GHz. and serve, for example, for the transmission of 960 or 1,800 telephone channels, or for the transmission of a color television signal having four audio channels, so that the basic band to be transmitted, which covers a range from a few Hz. to 10 MHz., offers no further room for the transmission of service channel lines. The only way to transmit service calls within the broadband radio relay system between radio relay stations having modulation and demodulation devices is by modulating the radio pilot frequencies. Normally, however, these modulation and demodulation devices are available only at the end stations of the radio relay network so that a service channel transmission from the individual relay stations is not possible.

In the Telefunken Journal, Vol. 33, Dec. 1966, pp. 295–332 such a known relay system is described.

In order to be able to transmit a larger number of services calls, remote control and remote monitoring signals from all of the broadband radio relay stations, an additional narrow band system is generally employed which is operated, for example, within the frequency range of 7.1 to 717 GHz., i.e., outside of the frequency band of the broadband system. Such a narrow band system permits the transmission of a maximum of 24 carrier frequency channels and is thus sufficient for the transmission of the data required for an interference-free operation of the broadband radio system.

For economical reasons, however, it is desirable to simultaneously utilize the antenna system of the broadband radio system, which is generally operated with two polarizations, for the additional or auxiliary narrow band system, in order to thus avoid an enlargement of the antenna system on the radio towers which are generally fully loaded in any case. Of course, in such a case, care must be taken that the requirements for the narrow band system as regards reflection and transmission losses must be met.

SUMMARY OF THE INVENTION

The present invention provides a system arrangement whereby the narrow band system may be connected to the existing antenna of the broadband system with the little additional circuitry. According to the invention, in order to simultaneously cut in or mix the signals from an auxiliary narrow band radio relay system with those of a broadband system of the type wherein the transmitters and receivers are connected, via suitable filters, to respective common transmitting or common receiving lines which are connected to the antenna via a system-combining filter, a narrow band system is provided wherein each transmitter and its associated receiver are coupled via a suitable filter to a common branch transmitting-receiving line and the branch transmitting-receiving lines are coupled via a further common filter to a common receiving-transmitting line for the entire narrow band system. This common system receiving-transmitting line is in turn connected, via a band-pass filter tuned to the frequency band of the auxiliary system, to the third port of a four-port circulator which together with the band-pass filter forms a part of a system combining or mixing filter. The first port of the circulator is connected to the common antenna and the remaining ports of the circulator are respectively connected, via two identical band-pass filters which are tuned to the frequency band of the broadband system and which also are included in the system-combining filter, to the common receiving and common transmitting lines of the broadband system.

According to a further embodiment of the present invention, in the case where an antenna operating with two polarizations is utilized, a polarization filter is provided between the antenna and the first port of the circulator, and either the common transmitting line or the common receiving line of the main, or broadband, system is disconnected from its respective band-pass filter and connected directly to the polarization filter. The disconnected end of the band-pass filter is then terminated by an absorber, i.e., a matching load. Preferably the combining filters for the auxiliary system transmitters and receivers, for the interconnection thereof, are realized in the radio relay system of the present invention by so-called circulator filters.

DESCRIPTION OF THE PREFERRED EMBODIMENTS

Figure 1:
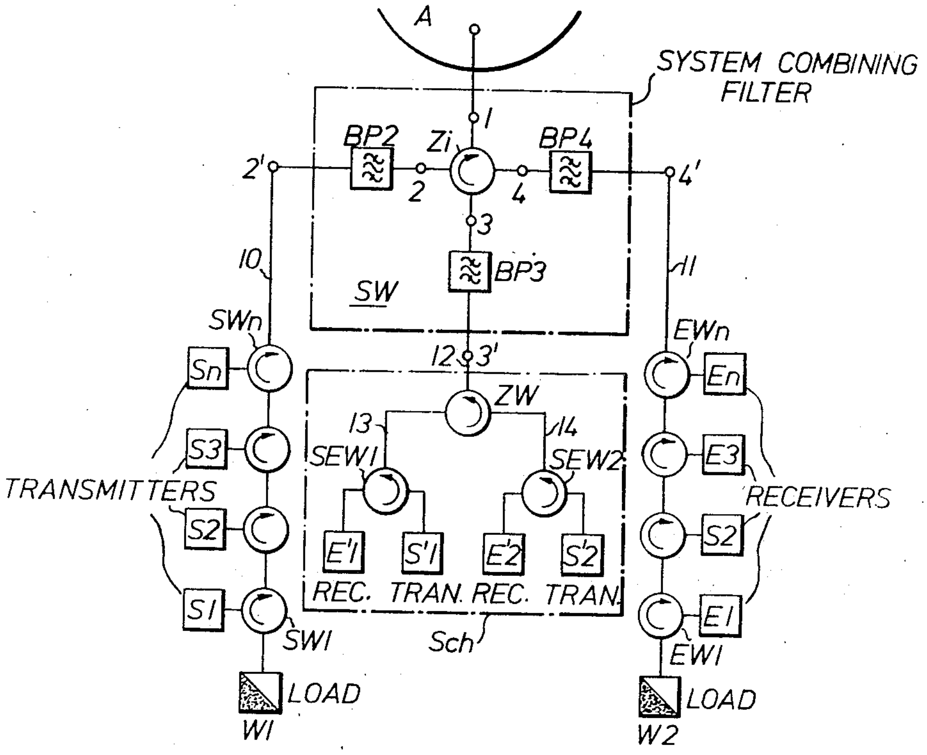
FIG. 1 is a block diagram of a combined broadband and narrow band radio relay system according to the invention.

Referring now to FIG. 1, there is shown a radio relay system according to the present invention for a single relay station wherein not only, as was previously the custom, is the main system connected to the common antenna A, but additionally a further, preferably narrow band radio system Sch is connected thereto. In the preferably broadband main system the individual transmitters Sl....Sn are connected to a common transmitting line 10 via associated transmitter combining filters SW1....SWn in a known manner. In the illustrated embodiment these combining filters comprise band-pass filters (not specifically illustrated in FIG. 1) tuned to a narrow frequency band and circulators. The thus-formed common transmitter chain is provided with a load absorber W1 at one end thereof, i.e., the unconnected port of the first circulator SW1 to provide proper termination while the other end thereof is connected to a terminal 2′ of a system-combining filter S. The system-combining filter S includes a four-port circulator Zi and a plurality of band-pass filters BP2, BP3 and BP4, which are connected between the respectively numbered ports 2, 3, 4 of the circulator Zi and the terminals 2′, 3′, 4′ of the system-combining filter S. Thus as illustrated, the common transmitting line 10 is ultimately connected to port 2 of the circulator Zi.

In the same manner as that for the transmitters Sl....Sn, the receivers E1....En of the main or broadband system are connected to a common receiving line 1 via associated combining filters EWl....EWn. The remaining third port of the first filter EW1, which is again realized in a known manner by a circulator with the associated filter, is connected to or terminated by an absorptive load W2. The free end of the common receiving line 11 is connected to the terminal 4′ of the system-combining filter S which, in turn, is connected via a band-pass filter BP4 to port 4 of the four-port circulator Zi. The two band-pass filters BP2 and BP4 are identically constructed and tuned to the frequency band of the main system.

As is further illustrated, port 1 of circulator Zi, which is directly connected to one terminal of the system combining filter S, is connected to the antenna A which is common for the entire system. The remaining terminal 3′ of the system combining filter S, which is connected via a band-pass filter BP3 to port 3 of circulator Zi, is connected to the common transmitting-receiving line 12 of the auxiliary radio system Sch. In this case, the band-pass filter BP3 is tuned to the frequency band of the auxiliary radio system Sch.

In the auxiliary radio system Sch, which includes a plurality of receivers E'1 and E'2, and a like plurality of transmitters S'1 and S'2, the associated transmitters and receivers S'1, E'1 and S'2, respectively, are connected via an associated transmitter-receiver combining filter SEW1 or SEW2, respectively, to common branch receiving-transmitting lines 13 and 14, respectively. These lines 13 and 14 are in turn connected via a combing filter ZW to the common system line 12.

In view of the reflection behavior of the system combining filter S, the reflection curves in the operating range of the main broadband system of the antenna input are of particular significance since the additional intermodulation noise produced by multiple reflections in the antenna feeder system is determined substantially by the final reflections and the internal reflections in the circuit.

Therefore, in order to avoid malfunction of the main system, the reflection factor at port 1 of the system-combining filter S must be kept as low as possible. This may be realized by a special balancing which simultaneously takes care that the input attenuation for the main system remains low. Furthermore, the system-combining filter S should exhibit sufficient decoupling in order to prevent interfering frequencies from the transmitters of the main system or from the auxiliary system from being coupled to the receivers E1....En. Such measures, as well as the design of the various components of the filters included in the system, are known in the art.

Figures 2, 3:
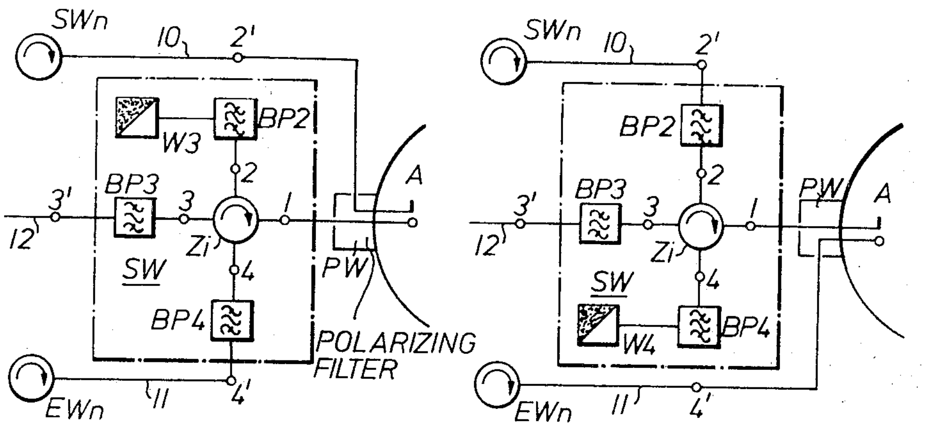
FIG. 2 is a block diagram of a portion of the combined system according to the invention showing a modification of the system of FIG. 1.
FIG. 3 is a block diagram of a portion of the combined system according to the invention showing a further modification of the system of FIG. 1.

Since radio relay systems of the type with which the present invention is concerned are usually operated with elements providing two polarizations, the present invention can also be modified in the manner illustrated schematically in FIG. 2. In this embodiment, a conventional polarization filter PW is connected ahead of antenna A, and the common transmitting line 10 for the transmitters S1....Sn of the main system is disconnected from the band-pass filter BP2 and is directly connected to an input of the polarization filter PW. The then free connecting point 2 is connected with an absorber, or load, W3. In this embodiment, the receivers E1....En of the main system and the auxiliary system Sch are connected to the system combining filter S in the same manner as described above in connection with FIG. 1. However, port 1 of the system combining filter S is connected to the common antenna A via an input of the polarization filter PW.

It is also possible, when a polarization filter PW is employed, to connect the receivers E1....En of the main system to an input of the polarization filter PW of the common antenna A and to combine the auxiliary system Sch and the transmitters S1....Sn of the main system via the system combining filter S and to subsequently feed them to the second input of the polarization filter PW.

This is shown schematically in FIG. 3, wherein the transmitters S1....Sn of the main system are connected via the common transmitting line 10, connecting point 2' and band-pass filter BP2 to port 2 of circulator Zi, whose port 1 is connected to one input terminal of the polarization filter PW, connected ahead of the common antenna A, while the receivers E1....En of the main system are connected via the common line 11 directly with the other terminal of the polarization filter PW. The remaining free port 4 of circulator Zi is connected to an absorber W4. As in all the embodiments, the auxiliary system Sch is connected with port 3 of circulator Zi via terminal 3' and band-pass filter BP3.

A circuit of the present invention reduced to practice indicated that even with a broad band system for 1,800 channels, it was possible to cut in an auxiliary system without interference. The reflection curve of the antenna input 1 was here measured over a frequency range from 5.9 to 6.5 GHz. and was found to be less than 0.02. The reflection values of the receiver of transmitter inputs 4' or 2', respectively, of the broadband system were less than 0.05, the input 3' of the 7 GHz. narrow band system showed reflection values which were less than 0.13 over a frequency range from 7.1 to 7.7 GHz. and thus also fall below the permissible reflection values. Furthermore, decoupling of the individual ports of the system combining filter S is sufficient for faultfree operation. The smallest decoupling value of the transmitters and receivers of the main system between points 2' or 4', respectively, at the cutoff frequencies was 32 db. In the 6 GHz. band, the decoupling values between point 3' and point 4' were higher than 70 db., whereas the decoupling values in the 7 GHz. range between connecting point 2' and connecting point 3' were higher than 65 db. The transmission loss in the main system was 0.35 db. for the receivers, 0.25 db. for the transmitters. The losses in the auxiliary system were measured to be 1.1 db. in both cases.

It will be understood that the above description of the present invention is susceptible to various modifications, changes and adaptations, and the same are intended to be comprehended within the meaning and range of equivalents of the appended claims.

I claim:

1. In a broadband radio relay system wherein all of the individual transmitters and receivers at a relay station are connected via appropriate combining filters to a respective common transmitting or a common receiving line, which lines are in turn connected to the system antenna, an arrangement for simultaneously connecting an auxiliary narrow band radio relay system operating in a band outside that of said broadband system to the said antenna, comprising, in combination:

a four-terminal system combining filter having its first terminal connected to said antenna and including a four-port circulator and a plurality of band-pass filters, said circulator having its first port connected to said first terminal of said system combining filter;

said auxiliary radio relay system having a plurality of transmitters and receivers with each transmitter and its associated receiver being coupled via a combining filter to a separate branch transmission-reception line and with the branch transmission-reception lines being coupled via a further combining filter to a common transmission-reception line for said auxiliary system;

said common transmission-reception line for said auxiliary system being connected to a further terminal of said system-combining filter, which terminal is connected via one of said band-pass filters, which is tuned to the frequency band of said auxiliary narrow band system, to the third port of said circulator; and at least one of said common transmitting and receiving lines of said broadband system is connected to a further one of said terminals of said system-combining filter, which terminal is connected via one of said band-pass filters, which is tuned to the frequency band of the broadband system, to one of the two remaining ports of said circulator.

2. The radio relay system as defined in claim 1 wherein both said common receiving line and said common transmitting line of said broadband system are connected to individual ones of the two remaining terminals of said system-combining filter, which terminals are connected by identical broadband filters to the respective ones of the two remaining ports of said circulator.

3. The radio relay system as defined in claim 2 wherein the terminal of said system combining filter, which is connected, via one of said band-pass filters, to the second port of said circulator, is connected to said common receiving line of said broadband system, and the terminal of said system combining filter, which is connected, via one of said band-pass filters, to the fourth port of said circulator, is connected to said common transmitting line of said broadband system.

4. The radio relay system as defined in claim 1 wherein: said system antenna operates with elements having two different polarizations; a polarization filter is connected to the inputs of said antenna; said common transmitting line of said broadband system is directly connected to one of the inputs of said polarization filter; said first terminal of said system-combining filter is connected to the other input of said polarization filter;

said common receiving line is connected to said further one of said terminals of said system-combining filter; and the remaining port of said four-port circulator is connected to an absorptive load.

5. The radio relay system as defined in claim 1 wherein: said system antenna operates with elements having two different polarizations; a polarization filter is connected to the inputs of said antenna; said common receiving line of said broadband system is directly connected to one of the inputs of said polarization filter; said first terminal of said system-combining filter is connected to the other input of said polarization filter; said common transmitting line is connected to said further one of said terminals of said system combining filter; and the remaining port of said four-port circulator is connected to an absorptive load.

* * * * *